United States Patent Office 3,666,466

Patented May 30, 1972

3,666,466

DEACTIVATING DUAL RESPONSE PHOTOSENSITIVE COMPOSITIONS WITH VISIBLE AND ULTRAVIOLET LIGHT

Peter S. Strilko, Wilmington, Del., assignor to E. I. du Pont de Nemours and Company, Wilmington, Del.

No Drawing. Filed Nov. 26, 1969, Ser. No. 880,388
Int. Cl. G03c 5/24
U.S. Cl. 96—48 3 Claims

ABSTRACT OF THE DISCLOSURE

Method for deactivating a photosensitive composition, which composition is characterized by forming color on irradiation with ultraviolet light and being deactivated against color formation on irradiation with light of longer wavelengths, e.g., visible light radiation. The method comprises exposing the surface of the photosensitive composition to be deactivated to both ultraviolet and visible light radiation, with the intensity of the ultraviolet radiation being an amount up to the maximum amount said surface of the composition can absorb without undergoing substantial color formation, the intensity of the visible light radiation being effective for deactivation, whereby the resistance of the composition to color formation on subsequent exposure to ultraviolet light is either increased or the time required to achieve a particular degree of such resistance is decreased.

BACKGROUND OF THE INVENTION

(1) Field of the invention

This invention relates to a method for photodeactivating photosensitive color-forming compositions by in situ formation of a deactivating agent. More specifically the invention relates to such method wherein the photosensitive composition comprises (a) color-forming components responsive to ultraviolet radiation which produce color by a first photo-induced oxidation-reduction reaction, and (b) deactivating components responsive to a visible light radiation which produce a deactivating agent by a second photo-induced oxidation-reduction reaction. The deactivating agent thus produced inhibits the color-forming reaction on subsequently exposing the compositions to the ultraviolet light. The deactivating method of this invention is accomplished by employing a controlled amount of ultraviolet light radiation in conjunction with the usual deactivating visible light radiation.

(2) Description of the prior art

MacLachlan U.S. Pat. 3,390,996 discloses that photosensitive color forming compositions, such as hexaarylbiimidazoles and leuco dyes which form color on radiation with ultraviolet light, can be deactivated against such color formation by incorporating therewith a light-activatable oxidation-reduction system, such as a visible light activatable quinone in combination with an aliphatic polyether or other source of extractable hydrogen. Irradiation of such system with ultraviolet light produces color corresponding to the dye form of the leuco dye component; on the other hand, irradiation with visible light deactivates the color forming components against color formation. Deactivation is attributable to in situ formation of a hydroquinone of the quinone employed, which preferentially reduces photoactivated hexaarylbiimidazole before it can oxidize the leuco dye to color.

The MacLachlan patent further states that since most compounds have rather broad light absorption bands the wavelength ranges of the color-forming and deactivating radiations may overlap; that overlap is sometimes undesirable because it can reduce photographic speed and final color density, that small amounts of overlap produce no undesirable results and in some cases can even result in more efficient deactivation.

Cescon U.S. Pat. 3,390,994 describes a photodeactivatable system for use with leuco triarylmethanes/hexaarylbiimidazoles color-forming components which employs either pyrenequinone or phenanthrenequinone as the oxidant member of the deactivating system and an alkyl nitriloalkanoate as the reductant member. The described system is especially useful for producing positive prints by contact or projection techniques, first irradiating imagewise with deactivating radiation, thus forming a latent image, then exposing the previously unexposed area to color-induced radiation to develop the image.

Strilko U.S. patent application Ser. No. 740,476, filed June 27, 1968, describes photo-imageable and photodeactivatable compositions involving leuco triarylmethanes, hexaarylbiimidazoles, selected mixtures of quinones, and selected aliphatic ethers containing oxymethylene groups. To avoid color formation during the deactivation exposure the patent application teaches that filters can be used to screen out activating radiation and prevent such radiation from striking the color forming compositions. Alternatively, it suggests that mono chromatic light can be used that only the deactivation components can absorb; or a light source should be employed which emits principally in the photodeactivatable region with substantially no light emitted in the region normally used for inducing color formation.

In the foregoing photoimageable/photodeactivatable systems, photodeactivation is normally slower than photo color formation, and tends to limit the speed with which they can be imaged and fixed. It is desirable in many applications to reduce the access time to the final product. It is also desirable to produce imaged and fixed products which show good color contrast between the colored and deactivated areas, especially in making positive coppies. It is also desirable to enhance the degree of deactivation, that is the resistance of a particular deactivated composition to develop color under a particular set of light conditions. The purpose of this invention is to achieve these desirable goals.

SUMMARY OF THE INVENTION

Process for deactivating a photoimageable photodeactivatable composition, which composition comprises an admixture of (A) a color-forming component comprising (1) an organic color generator and (2) a photoactivatable first oxidant which can oxidize the color generator to a colored compound on irradiating the first oxidant with ultraviolet light, and (B) a deactivating component comprising (1) a second photoactivatable oxidant which is activated by visible light radiation, is not an oxidant for the color generator but is reducible when activated by said visible light radiation, and (2) a reductant for the second oxidant but not for the first oxidant, said reductant being capable of reducing the second oxidant on irradiation by said visible light radiation to a second reductant which is a reductant for the photoactivated first oxidant, whereby the second reductant prevents the color forming reaction between the color generator and the first oxidant;

which process comprises exposing at least a portion of the surface of the composition to both ultraviolet and visible light radiation with the intensity of the ultraviolet radiation being an amount up to the maximum amount any portion of the entire surface of the composition can absorb without undergoing substantial color formation, and with the intensity of the visible light radiation being sufficient to deactivate the exposed portion of the composition.

DESCRIPTION OF THE INVENTION

The term "deactivation" as used herein refers to the prevention of color formation in the photosensitive composition. Deactivation occurs when the composition is subjected to a light exposure as defined sufficient to render the exposed area of the composition relatively insensitive to color-inducing radiation (ultraviolet radiation, in this instance). The degree of deactivation achieved depends on the intensity of the deactivating invisible light radiation and the duration of the exposure. The thus exposed material is "deactivated" or "fixed," with the deactivated area serving as the background against which the colored (imaged) area is to be viewed. The background's resistance to form color on subsequent exposure to ultraviolet imaging radiation depends in general on the intensity of the ultraviolet light and the duration of the exposure, thus the degree of deactivation obtained in a particular composition can be measured by exposure to a preselected dosage of ultraviolet imaging radiation that normally produces a given amount of color.

Practically speaking, the degree of deactivation of the compositions obtained is that in which the composition is rendered practically insensitive to color formation on exposure to room light, daylight and sunlight, which normally contain ultraviolet components. However, the process of this invention allows one to attain practically any degree of deactivation.

In practicing the deactivation step of this invention, the compositions can be irradiated with the ultraviolet and the visible light simultaneously, or sequentially, with visible range applied first. Preferably, the invention is carried out with simultaneous exposure.

It will be appreciated that since the color-forming first photooxidant is usually present in greater proportion than the deactivating second photooxidant such compositions cannot be completely deactivated by irradiation with visible light alone. It is possible to overcome the thus partially attained deactivation state by exposure to a sufficiently large dosage of ultraviolet, color-inducing radiation. The exposure technique of the present invention, however, through its combination of controlled dosages of ultraviolet and visible light can reduce the color-forming capability of the composition to nil levels even on subsequent exposure to rather large dosages of ultraviolet light.

It is believed that the controlled use of both radiations as defined decreases the concentration of the first photooxidant (i.e., the oxidant of the color-forming portion of the composition), in the final multi-irradiated composition, while maximizing the concentration of the reductant produced in situ from the second photooxidant (that of the deactivation portion). Thus it will be evident that the invention method permits a decrease in the concentration of the deactivating second photooxidant in the initial formulation without adversely affecting its deactivation capabiliy. Decreasing the deactivating second photooxidant concentration is desirable since such compound normally shows some absorption in the color-forming ultraviolet range and thus tends to retard color formation by screening such light from the first photooxidant during the color-forming step of the overall imaging process.

In a preferred imaging (deactivation procedure) a previously unexposed photosensitive composition coated on paper or film is (a) deactivated by being simultaneously exposed to both radiations, as defined above, with the deactivating radiation applied imagewise to capture the image in the form of a deactivated area and (b) imaged, i.e., the color developed in the previously unexposed area by exposing the material to a color-forming dosage of light, thereby producing a positive print of the original image. Alternatively the photosensitive composition may first be imagewise irradiated for color formation, then deactivated to the desired degree by exposure to both radiations as described, to thus obtain a negative (or reversal) print. Background areas of the prints produced by either method in accordance with the invention will show an enhanced degree of deactivation. Whatever the embodiment of the invention employed, the exposure to ultraviolet (normally color-forming) radiation in the deactivation step should be practically the maximum that can be applied (in terms of wavelength, intensity and duration) without unduly forming color. The wavelengths of these radiations should coincide with the absorption bands of the color-forming and deactivating systems. The ratio of the intensity of the ultraviolet and the visible wavelengths in the overall exposure for deactivation will depend largely on the color-forming speed of the composition. The visible deactivating radiation will ordinarily be as intense as possible for maximum speed. In general, the more intense the visible deactivating radiation and the slower the color-forming speed of the system, the greater may be the intensity and the flux density of the ultraviolet radiation used for enhanced deactivation in accordance with the method of the invention.

THE PHOTOSENSITIVE COMPOSITION EMPLOYED

As described above in the Summary, the composition comprises a color-forming component and a deactivating component.

The color-forming component comprises a color generator and a first photoactivatable oxidant.

The first photoactivatable oxidant is preferably a 2,2',4,4',5,5'-hexaarylbiimidazole, sometimes called a 2,4,5-triarylimidazolyl dimer. They are photodissociable to the corresponding triarylimidazolyl radicals. These hexaarylbiimidazoles absorb maximally in the 255–275 m$\mu$ region, and usually show some, though lesser absorption in the 300–375 m$\mu$ region. Although the absorption bands tend to tail out to include wavelengths as high as about 420 m$\mu$, they thus normally require light rich in the 255–375 m$\mu$ wavelengths for their dissociation. Thus the radiation of the first wavelength range used in the process of this invention is ultraviolet light.

The hexaarylbiimidazoles can be represented by the formula

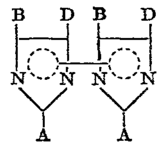

wherein A, B and D represent aryl groups which can be the same or different, carbocyclic or heterocyclic, unsubstituted or substituted with substituents that do not interfere with the dissociation of the hexaarylbiimidazole to the triarylimidazolyl radical or with the oxidation of the leuco dye, and each dotted circle stands for four delocalized electrons (i.e., two conjugated double bonds) which satisfy the valences of the carbon and nitrogen atoms of the imidazolyl ring. The B and D aryl groups can each be substituted with 0–3 substituents and the A aryl groups can be substituted with 0–4 substituents.

The aryl groups include one- and two-ring aryls, such as phenyl, biphenyl, naphthyl, pyridyl, furyl and thienyl. Suitable inert (i.e., non-interfering with the processes described herein) substituents on the aryl groups have Hammett sigma (para) values in the −.5 to 0.8 range, and are other than hydroxyl, sulfhydryl, amino, alkylamino or dialkylamino groups. Representative substituents and their sigma values (relative to H=.00), as given by Jaffe, Chem. Rev. 53, 219–233 (1953) are: methyl (−0.17), ethyl (−0.15), t-butyl (−0.20), phenyl (0.01), butoxy (−0.32), phenoxy (−0.03), fluoro (0.06), chloro (0.23), bromo (0.23), iodo (0.28), methylthio (−0.05), nitro (0.78), ethoxycarbonyl (0.52), and cyano (0.63). The foregoing substituents are preferred; however, other substituents which may be employed include trifluoromethyl (0.55), chloromethyl (0.18), carboxyl (0.27), cyanomethyl (0.01), 2-carboxyethyl (−0.07), and methylsulfonyl (0.73). Thus, the substituents may be halogen, cyano, lower hydrocarbyl (including alkyl, halo alkyl, cyanoalkyl, hydroxyalkyl and aryl), lower alkoxy, aryloxy, lower alkylthio, arylthio, sulfo, alkyl sulfonyl, arylsulfonyl, and nitro, and lower alkylcarbonyl. In the foregoing list, alkyl groups referred to therein are preferably of 1–6 carbon atoms; while aryl groups referred to therein are preferably of 6–10 carbon atoms.

Preferably the aryl radicals are carbocyclic, particularly phenyl, and the substituents have Hammett sigma values in the range −.4 to +.4, particularly lower alkyl, lower alkoxy, chloro, fluoro, bromo and benzo groups.

In a preferred hexaarylbiimidazole class, the 2 and 2′ aryl groups are phenyl rings bearing an ortho substituent having a Hammett sigma value in the range −.4 to +.4. Preferred ortho substituents are fluorine, chlorine, bromine, methyl and methoxy groups, especially chloro. Such biimidazoles tend less than others to form color when the light-sensitive compositions are applied to and dried on substrates at somewhat elevated temperatures, e.g., in the range 70–100° C.

Most preferably, the 2-phenyl ring carries only the above-described ortho group, and the 4- and 5-phenyl rings are either unsubstituted or substituted with lower alkoxy.

Preferred hexaarylbiimidazoles include 2,2′-bis(o-chlorophenyl)-4,4′,5,5′-tetraphenylbiimidazole and 2,2′-bis-(o-chlorophenyl) - 4,4′,5,5′ - (m-methoxyphenyl)biimidazole.

Representative hexaarylbiimidazoles which may be employed in this invention include:

2,2′-bis(o-bromophenyl) - 4,4′,5,5′ - tetraphenylbiimidazole,
2,2′-bis(p-bromophenyl)-4,4′,5,5′-tetraphenylbiimidazole,
2,2′-bis(p-carboxyphenyl)-4,4′,5,5′-tetraphenylbiimidazole,
2,2′-bis(o-chlorophenyl)-4,4′,5,5′-tetrakis(p-methoxyphenyl)-biimidazole,
2,2′-bis(o-chlorophenyl)-4,4′,5,5′-tetraphenylbiimidazole,
2,2′-bis(o-chlorophenyl)-4,4′,5,5′-tetrakis(p-methoxyphenyl)-biimidazole,
2,2′-bis(p-cyanophenyl)-4,4′,5,5′-tetrakis(p-methoxyphenyl)-biimidazole,
2,2′-bis(2,4-dichlorophenyl)-4,4′,5,5′-tetraphenylbiimidazole
2,2′-bis(2,4-dimethoxyphenyl)-4,4′,5,5′-tetraphenylbiimidazole,
2,2′-bis(o-ethoxyphenyl)-4,4′,5,5′-tetraphenylbiimidazole,
2,2′-bis(m-fluorophenyl)-4,4′,5,5′-tetraphenylbiimidazole,
2,2′-bis(o-fluorophenyl)-4,4′,5,5′-tetraphenylbiimidazole,
2,2′-bis(p-fluorophenyl)-4,4′,5,5′-tetraphenylbiimidazole,
2,2′-bis(o-hexoxyphenyl)-4,4′,5,5′-tetraphenylbiimidazole,
2,2′-bis(o-hexylphenyl)-4,4′,5,5′-tetrakis(p-methoxyphenyl)-biimidazole,
2,2′-bis(3,4-methylenedioxyphenyl)-4,4′,5,5′-tetraphenylbiimidazole,
2,2′-bis(o-chlorophenyl)-4,4′,5,5′-tetrakis(m-methoxyphenyl)biimidazole,
2,2′-bis(o-chlorophenyl)-4,4′,5,5′-tetrakis[m-(betaphenoxyethoxyphenyl)]biimidazole,
2,2′-bis(2,6-dichlorophenyl)-4,4′,5,5′-tetraphenylbiimidazole,
2,2′-bis(o-methoxyphenyl)-4,4′,5,5′-tetraphenylbiimidazole,
2,2′-bis(p-methoxyphenyl)-4,4′-bis(o-methoxyphenyl)-5,5′-diphenylbiimidazole,
2,2′-bis(o-nitrophenyl)-4,4′,5,5′-tetraphenylbiimidazole,
2,2′-bis(p-phenylsulfonylphenyl)-4,4′,5,5′-tetraphenylbiimidazole,
2,2′-bis(p-sulfamoylphenyl)-4,4′,5,5′-tetraphenylbiimidazole,
2,2′-bis(2,4,6-trimethylphenyl)-4,4′,5,5′-tetraphenylbiimidazole,
2,2′-di-4-biphenylyl-4,4′,5,5′-tetraphenylbiimidazole,
2,2′-di-1-naphthyl-4,4′,5,5′-tetrakis(p-methoxyphenyl)biimidazole,
2,2′-di-9-phenanthryl-4,4′,5,5′-tetrakis(p-methoxyphenyl)biimidazole,
2,2′-diphenyl-4,4′,5,5′-tetra-4-biphenylbiimidazole,
2,2′-diphenyl-4,4′5,5′-tetra-2,4-xylylbiimidazole,
2,2′-di-3-pyridyl-4,4′,5,5′-tetraphenylbiimidazole,
2,2′-di-3-thienyl-4,4′,5,5′-tetraphenylbiimidazole,
2,2′-di-o-tolyl-4,4′,5,5′-tetraphenylbiimidazole,
2,2′-di-p-tolyl-4,4′-di-o-tolyl-5,5′-diphenylbiimidazole,
2,2′-di-2,4-xylyl-4,4′,5,5′-tetraphenylbiimidazole,
2,2′,4,4′,5,5′-hexakis(p-benzylthiophenyl)biimidazole,
2,2′,4,4′,5,5′-hexa-1-naphthylbiimidazole,
2,2′,4,4′,5,5′-hexaphenylbiimidazole,
2,2′-bis(2-nitro-5-methoxyphenyl)-4,4′,5,5′-tetraphenylbiimidazole, and
2,2′-bis(o-nitrophenyl)-4,4′,5,5′-tetrakis(m-methoxyphenyl)biimidazole.
2,2′-bis(2-chloro-5-sulfophenyl)-4,4′,5,5′-tetraphenylbiimidazole.

The hexaarylbiimidazoles are conveniently obtained by known methods as more particularly described by British Pat. 997,396 and by Hayashi et al., Bull. Chem. Soc. Japan, 33, 565 (1960) and Cescon and Dessauer U.S. Pat. 3,445,234. The preferred method, involving oxidative dimerization of the corresponding triarylimidazole with ferricyanide in alkali, generally yields the 1-2′-hexaarylbiimidazoles, although other isomers, such as the 1,1′,1,4′, 2,2′,2,4′ and 4,4′-hexaarylbiimidazoles are sometimes also obtained admixed with the 1,2′-isomer. For the purposes of this invention, it is immaterial which isomer is employed so long as it is photo-dissociable to the triarylimidazolyl radical, as discussed above.

The color generator is preferably a leuco dye. By the term "leuco dye" is meant the colorless (i.e., the reduced) form of a dye compound which may be oxidized to its colored form by the triarylimidazolyl radical.

Leuco dyes which may be oxidized to color by the triarylimidazolyl radicals generated from the compositions of this invention include: aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo-p,p′-biphenols - 2(p-hydroxyphenyl)-4,5 - diphenylimidazoles, phenethylanilines, and the like. These classes of leuco dyes are described in greater detail in Cescon and Dessauer U.S. application Ser. No. 728,781, filed May 13, 1968 now U.S. Pat. 3,445,234; Cescon, Desaure and Looney U.S. Pat. 3,423,427; Cescon, Dessauer and Looney U.S. application Ser. No. 290,583, filed June 26, 1963, now U.S. Pat. 3,449,379; Read U.S. Pat. 3,395,018 and Read U.S. Pat. 3,390,997.

The preferred leucos are are the aminotriarylmethanes. Preferably the aminotriarylmethane is one wherein at least two of the aryl groups are phenyl groups having (a)

an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio. Preferably the third aryl group is the same as the first two.

Particularly preferred aminotriarylmethanes have the following structural formula:

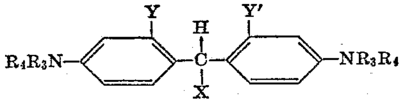

wherein $R_3$ and $R_4$ are selected from lower alkyl (preferably ethyl) or benzyl, Y and Y' are lower alkyl (preferably methyl) and X is selected from

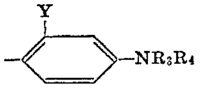

p-methoxyphenyl, 2-thienyl, phenyl, 1-naphthyl, 2,3-dimethoxyphenyl, 3,4-methylenedioxyphenyl, or p-benzylthiophenyl. Preferably X is selected from

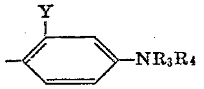

phenyl, 1-naphthyl, or p-benzylthiophenyl.

These triarylmethanes are employed as salts of strong acids: for example, mineral acids such as hydrochloric, hydrobromic, sulfuric, nitric, phosphoric; organic acids such as acetic, oxalic, p-toluenesulfonic, trichloroacetic acid, trifluoroacetic acid, perfluoroheptanoic acid; and Lewis acids such as zinc chloride, zinc bromide, and ferric chloride; the proportion of acid usually varying from 0.33 mole to 1 mole per amino group. The term "strong acid" as used herein is defined as an acid which forms a salt with an anilino amino group.

Specific examples of the aminotriarylmethanes employed in this invention are:

bis(4-amino-2-butylphenyl)(p-dimethylaminophenyl)methane
bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl)methane
bis(4-amino-3,5-diethylphenyl)(o-ethoxyphenyl)methane
bis(4-amino-3,5-diethylphenyl)(p-methoxyphenyl)methane
bis(4-amino-3,5-diethylphenyl)phenylmethane
bis(4-amino-3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane
bis(4-amino-o-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl)methane
bis(p-benzylethylaminophenyl)(p-chlorophenyl)methane
bis(p-benzylethylaminophenyl)(p-diethylaminophenyl)methane
bis(p-benzylethylaminophenyl)(p-dimethylaminophenyl)methane
bis(4-benzylethylamino-o-tolyl)(methoxyphenyl)methane
bis(p-benzylethylaminophenyl)-phenylmethane
bis(4-benzylethylamino-o-tolyl)(o-chlorophenyl)methane
bis(4-benzylethylamino-o-tolyl)(p-diethylaminophenyl)methane
bis(4-benzylethylamino-o-tolyl)(4-diethylamino-o-tolyl)methane
bis(4-benzylethylamino-o-tolyl)(p-dimethylaminophenyl)methane
bis[2-chloro-4-(2-diethylaminoethyl)ethylaminophenyl](o-chlorophenyl)methane
bis[p-bis(2-cyanoethyl)aminophenyl]phenylmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane
bis(4-diethylamino-o-tolyl)(p-diphenylaminophenyl)methane
bis(4-diethylamino-2-butoxyphenyl)(p-diethylaminophenyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl)methane
bis(p-diethylaminophenyl)(m-butoxyphenyl)methane
bis(p-diethylaminophenyl)(o-chlorophenyl)methane
bis(p-diethylaminophenyl)(p-cyanophenyl)methane
bis(p-diethylaminophenyl)(2,4-dichlorophenyl)methane
bis(p-diethylaminophenyl)(4-diethylamino-1-naphthyl)methane
bis(p-diethylaminophenyl)(p-dimethylaminophenyl)methane
bis(p-diethylaminophenyl)(4-ethylamino-1-naphthyl)methane
bis(p-diethylaminophenyl)2-naphthylmethane
bis(p-diethylaminophenyl)(p-nitrophenyl)methane
bis(p-diethylaminophenyl)2-pyridylmethane
bis(p-diethylamino-m-tolyl)(p-diethylaminophenyl)methane
bis(4-diethylamino-o-tolyl)(o-chlorophenyl)methane
bis(4-diethylamino-o-tolyl)(p-diethylaminophenyl)methane
bis(4-amino-3,5-diethylphenyl)(o-ethoxyphenyl)methane
bis(4-diethylamino-o-tolyl)phenylmethane
bis(4-dimethylamino-2-bromophenyl)phenylmethane
bis(p-dimethylaminophenyl)(4-anilino-1-naphthyl)methane
bis(p-dimethylaminophenyl)(p-butylaminophenyl)methane
bis(p-dimethylaminophenyl)(p-sec. butylethylaminophenyl)methane
bis(p-dimethylaminophenyl)(p-chlorophenyl)methane
bis(p-dimethylaminophenyl)(p-diethylaminophenyl)methane
bis(p-dimethylaminophenyl)(4-dimethylamino-1-naphthyl)methane
bis(p-dimethylaminophenyl)(6-dimethylamino-m-tolyl)methane
bis(p-dimethylaminophenyl)(4-dimethylamino-o-tolyl)methane
bis(p-dimethylaminophenyl)(4-ethylamino-1-naphthyl)methane
bis(p-dimethylaminophenyl)(p-hexyloxyphenyl)methane
bis(p-dimethylaminophenyl)(p-methoxyphenyl)methane
bis(p-dimethylaminophenyl)(5-methyl-2-pyridyl)methane bis(p-dimethylaminophenyl) 2-quinolylmethane
bis(p-dimethylaminophenyl) o-tolylmethane
bis(p-dimethylaminophenyl)(1,3,3-trimethyl-2-indolinylidenemethyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl) 1-naphthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
bis(4-ethylamino-m-tolyl)(p-dimethylaminophenyl)methane
bis(4-ethylamino-m-tolyl)(p-hydroxyphenyl)methane
bis[4-ethyl(2-hydroxyethyl)amino-m-tolyl](p-diethylaminophenyl)methane
bis[p-(2-hydroxyethyl)aminophenyl](o-chlorophenyl)methane
bis[p-(bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4-diethylamino-2-fluorophenyl)methane
tris(4-dimethylamino-2-fluorophenyl)methane
bis(2-bromo-4-diethylaminophenyl)phenylmethane
bis(2-butoxy-4-diethylaminophenyl)phenylmethane
bis(4-diethylamino-o-tolyl)(p-methoxyphenyl)methane
bis(4-diethylamino-2-methoxyphenyl)(p-nitrophenyl)methane
bis(4-diethylamino-1-naphthyl)(4-diethylamino-o-tolyl)methane
bis(4-diethylamino-o-tolyl)1-naphthylmethane
4-[bis(4-diethylamino-o-tolyl)-methyl]-acetanilide
tris(4-dimethylamino-2-chlorophenyl)methane
bis(4-dimethylamino-2,5-dimethylphenyl)phenylmethane
bis(4-dimethylamino-o-tolyl)(o-bromophenyl)methane
bis(4-ethylbenzylamino-o-tolyl)(p-methoxyphenyl)methane
tris(p-dioctylamino-o-tolyl)methane
bis(4-diethylamino-o-tolyl)-4-methoxy-1-naphthyl methane
bis(4-diethylamino-o-tolyl)-3,4,5-trimethoxyphenyl methane
bis(4-diethylamino-o-tolyl)-p-hydroxyphenyl methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl sulfone
4-[bis(4-diethylamino-o-tolyl)-methyl]-methylsulfonanilide 4-[bis(4-diethylamino-o-tolyl)-methyl]-p-tolylsulfonanilide
bis(4-diethylamino-o-tolyl)-p-nitrophenyl methane
bis(4-diethylamino-o-tolyl)(2-diethylamino-4-methyl-5-thiazolyl) methane
bis(4-diethylamino-o-tolyl)(2-diethylamino-5-methyl-6-benzoxazolyl) methane
bis(4-diethylamino-o-tolyl)(2-diethylamino-5-methyl-6-benzothiazolyl) methane
bis(4-diethylamino-o-tolyl)(1-ethyl-2-methyl-3-indolyl)methane
bis(4-diethylamino-o-tolyl)(1-benzyl-2-methyl-3-indolyl) methane
bis(4-diethylamino-o-tolyl)(1-ethyl-2-methyl-5-methoxy-3-indolyl)methane
bis(1-o-xylyl-2-methyl-3-indolyl)(4-diethylamino-o tolyl)methane
bis(4-diethylamino-o-tolyl)(1-ethyl-5-indolinyl)methane
bis(1-isobutyl-6-methyl-5-indolinyl)(4-diethylamino-o-tolyl)methane
bis(4-diethylamino-o-tolyl)(8-methyl-9-julolindinyl)methane
bis(4-diethylamino-2-acetamidophenyl)(4-diethylamino-o-tolyl)methane
4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)(4-acrylamidophenyl)methane
bis(4-dethylamino-o-tolyl)(p-benzylthiophenyl)methane
bis(4-diethylamino-o-tolyl)(4-isopropylthio-3-methylphenyl)methane
bis(4-diethylamino-o-tolyl)(4-chlorobenzylthiophenyl)methane
bis(4-diethylamino-o-tolyl)(2-furyl)methane
bis(4-diethylamino-o-tolyl)(3,4-methylenedioxyphenyl)methane
bis(4-diethylamino-o-tolyl)(3,4-dimethoxyphenyl)methane
bis(4-diethylamino-o-tolyl)(3-methyl-2-thienyl)methane
bis(4-diethylamino-o-tolyl)(2,4-dimethoxyphenyl)methane
bis[4-(2-cyanoethyl)(2-hydroxyethyl)amino-o-tolyl](p-benzylthiophenyl)methane
bis[4-(2-cyanoethyl)(2-hydroxyethyl)amino-o-tolyl] 2-thienylmethane
bis(4-dibutylamino-o-tolyl)2-thienylmethane
bis(4-diethylamino-2-ethylphenyl)(3,4-methylenedioxyphenyl)methane
bis(4-diethylamino-2-fluorophenyl)(p-benzylthiophenyl)methane
bis(4-diethylamino-2-fluorophenyl)(3,4-methylenedioxyphenyl)methane
bis(4-diethylamino-o-tolyl)(p-methylthiophenyl)methane
bis(4-diethylamino-o-tolyl)2-thienylmethane
bis(4-dimethylamino-2-hexylphenyl)(p-butylthiophenyl)methane
bis[4-(N-ethylanilino)-o-tolyl](3,4-dibutoxyphenyl)methane
bis[4-bis(2-hydroxyethyl)amino-2-fluorophenyl](p-benzylthiophenyl)methane
bis(4-diethylamino-o-tolyl)-p-chlorophenyl methane
bis(4-diethylamino-o-tolyl)-p-bromophenyl methane
bis(4-diethylamino-o-tolyl)-p-fluorophenyl methane
bis(4-diethylamino-o-tolyl)-p-tolyl methane
bis(4-diethylamino-o-tolyl)-4-methoxy-1-naphthyl methane
bis(4-diethylamino-o-tolyl)3,4,5-trimethoxyphenyl methane
bis(4-diethylamino-o-tolyl)-p-hydroxyphenyl methane
bis(4-diethylamino-o-tolyl)-3-methylthienyl methane.

The deactivating component of the photosensitive composition comprises a second photoactivatable oxidant and a reductant. The deactivating component is sometimes referred to as a "redox couple." Preferably the second photoactivatable oxidant is a quinone, e.g., pyrenequinone or phenanthrenequinone; and the reductant is a polyether, or a compound of the formula $$N[(CH_2)_nCOOR]_3$$

wherein $n$ is the integer 1 or 2 and R is lower alkyl. Most preferably the deactivating components are a polynuclear quinone absorbing principally in the 430–550 mμ region such as 1,6-pyrenequinone, 1,8-pyrenequinone, 9,10-phenanthrenequinone and mixtures thereof, most preferably 9,10-phenanthrenequinone; while the reductant member is preferably a $C_1$ to $C_4$ alkyl ester of nitrilotriacetic acid or 3,3',3''-nitrilotripropionic acid, most preferably trimethyl nitrilotripropionate.

Thus compositions useful in the invention include these described in MacLachlan U.S. Pat. 3,390,996, issued July 2, 1968 which composition disclosure is incorporated herein by reference. Particularly preferred is the composition embodiment described in column 3, line 68 through column 4, line 2 of the patent wherein the color generator is an aminotriarylmethane containing at least two p-dialkylamino-substituted phenyl groups having as a substituent ortho to the methane carbon atom an alkyl, alkoxy or halogen, the first photoactivatable oxidant is a 2,2'(o-substituted phenyl) - 4,4',5,5' - tetraphenyl biimidazole, the second photoactivatible (the oxidant of said patent) oxidant redox couple is a quinone and the reductant component (of the redox couple of the patent) is a polyether. The ortho-substituents on the 2 and 2'-phenyl groups are preferably F, Cl, Br, alkyl, alkoxyl, or benzo. These preferred compositions and the components thereof are described in said patent in column 4, line 56 to column 5, line 4; column 8, lines 34 to 56; column 11, lines 11–19; and column 12, lines 21–23; each incorporated herein by reference.

The compositions useful herein also include those compositions described in Cescon U.S. Pat. 3,390,994, issued July 2, 1968 which composition disclosure is incorporated herein by reference. In particular the embodiment described in column 2, lines 51 through 64 is incorporated herein by reference. This embodiment consists essentially of an intimate admixture of (a) a salt of an acid and the leuco form of a triphenylmethane dye having, in at least two of the phenyl rings positioned para to the methane carbon atom, a $C_1$ to $C_4$ dialkyl amino substituent, (b) a 2,2',4,4',5,5'-hexaarylbiimidazole wherein the aryl groups are alike or different and preferably have an ortho substituent in the 2, and 2'-aryl groups selected from the group consisting of chlorine, bromine, fluorine, lower alkoxy, methyl, and benzo, and (c) a redox couple which consists of (1) a pyrenequinone or phenanthrenequinone as oxidant and (2) a compound having the general formula $N[(CH_2)_nCOOR]_3$, wherein $n$ is the integer 1 or 2 and R is a straight chain lower alkyl as reductant. Component (a) and (b) form the color generator portion of the photosensitive composition, while component (c) forms the deactivating portion of the composition. Representative specific components specifically incorporated by reference herein are those found in column 3, line 21 to column 5, line 37 of said patent.

The deactivating portion of the composition of the previous paragraph may be replaced by a mixture of 1,6- and 1,8-pyrenequinone (in amounts of .04 to .4 mole per mole of biimidazole), either 9,10-phenanthrenequinone, perinaphthenone, or 4-methoxy-1,2-naphthoquinone (in an amount of .04 to 2 moles per mole of triimidazole); and an ether containing at least one oxymethylene group wherein the methylene bears at least one hydrogen, e.g.

$$RO{-}(CH_2\underset{\displaystyle (CH_2)_nR'}{\overset{}{C}}H{-}O)_m{-}R$$

where $n$ is 0–1, $m$ is 1 to 15, R is hydrogen, alkyl, phenyl, alkylphenyl, biphenylyl or acyl, R' is H when $n$ is zero and is H, OH or R when $n$ is 1.

A preferred photoimageable/photodeactivatable composition is:

(A) color-forming (imaging) components
- (1) a salt of a leuco triarylmethane and a salt forming acid; and
- (2) a hexaarylbiimidazole which absorbs principally in the ultraviolet region and is a photooxidant for the salt of the leuco triarylmethane; and (B) deactivating (image fixing) components
- (3) a second photooxidant (preferably a polynuclear quinone) which is activatable at longer wavelengths, e.g. visible light, than those required to activate the biimidazole, does not photooxidize leuco dye to dye, and is reducible in its photoactivated state to a second reductant; and
- (4) a first reductant (preferably an ether having abstractable hydrogen, an ester having abstractable hydrogen, a lower alkyl nitrilotriacetate or a lower alkyl 3,3',3''-nitrilotripropionate) which is a reductant for the photoactivated second oxidant but is not a reductant for the photoactivated biimidazole, said first reductant reducing the photoactivated second oxidant to the second reductant, said second reductant being a reductant for the activated biimidazole whereby it prevents the color-forming reaction between the activated biimidazole and leuco dye.

RATIO OF REACTANTS

The molar ratio of biimidazole photooxidant to aminotriarylmethane color-generator may vary from about 0.1:1 to about 10:1. The preferred range is from 1:1 to 2:1.

The quinone component of the redox couple is based on the biimidazole; molar ratios of from 0.01:1 to 2:1 may be employed with ratios of 0.2:1 to 0.5:1 being preferred. The reductant component (e.g., trimethyl 3,3',3''-nitrilotripropionate) of the redox couple (deactivating component) is employed in molar ratios of from about 1:1 to about 40:1 based on the quinone component.

OTHER COMPONENTS

Polymeric binders may also be present in the photosensitive compositions to thicken them or adhere them to substrates. Binders can also serve as a matrix for the composition and the mixture may be cast, extruded or otherwise formed into unsupported imageable films. Light-transparent and film-forming polymers, are preferred. Examples are ethyl cellulose, polyvinyl alcohol, polyvinyl chloride, polystyrene, polyvinyl acetate, poly(methyl methacryate), cellulose acetate, cellulose butyrate, cellulose acetate butyrate, cellulose nitrate, chlorinated rubber, co-polymers of the above vinyl monomers, and gelatin. Binder or matrix amounts vary from about 0.5 part to about 200 parts by weight per part of combined weight of leuco dye and hexaarylbiimidazole. In general, from 0.5 to 10 parts are used as adhesive or thickener, while higher amounts are used to form the unsupported films. With certain polymers, it may be desirable to add a plasticizer to give flexibility to the film or coating. Plasticizers include the polyethylene glycols such as the commercially available carbowaxes, and related materials, such as substituted phenolethylene oxide adducts, for example the polyethers obtained from o-, m- and p-cresol, o-, m- and p-phenylphenol and p-nonylphenol, including commercially available materials such as the Igepal alkyl phenoxy polyoxyethylene ethanols. Other plasticizers are the acetates, propionates butyrates and other carboxylate esters of ethylene glycol, diethyleneglycol, glycerol, pentaerythritol and other polyhydric alcohols, and alkyl phthalates and phosphates such as dimethyl phthalate, diethyl phthalate, dioctyl phthalate, tributyl phosphate, trihexyl phosphate, trioctyl phosphate, triphenyl phosphate, tricresyl phosphate and cresyl diphenyl phosphate.

SUBSTRATES

For imaging according to this invention, the compositions may be coated upon or impregnated in substrates following known techniques. Substrates include materials commonly used in the graphic arts and in decorative applications such as paper ranging from tissue paper to heavy cardboard, films of plastics and polymeric materials such as regenerated cellulose, cellulose acetate, cellulose nitrate, polyester of glycol and terephthalic acid, vinyl polymers and co-polymers, polyethylene, polyvinylacetate, polymethyl methacrylate, polyvinylchloride; textile fabrics; glass, wood and metals. The composition, usually as a solution in a carrier solvent described above may be sprayed, brushed, applied by a roller or an immersion coater, flowed over the surface, picked up by immersion or spread by other means, and the solvent evaporated. In general, solvents are employed which are volatizing at ordinary pressures. Examples are amides such as N,N-dimethylformamide and N,N-dimethylacetamide; alcohols and ether alcohols such as methanol, ethanol, 1-propanol, 2-propanol, butanol, and ethylene glycol; esters such as methyl acetate and ethyl acetate; aromatics such as benzene, o-dichlorobenzene, toluene; ketones such as acetone, methyl ethyl ketone, 3-pentanone; aliphatic halocarbons such as methylene chloride, chloroform, 1,1,2-trichloroethane, 1,1,2,2-tetrachloroethane, 1,1,2-trichloroethylene; miscellaneous solvents such as dimethylsulfoxide, pyridine, tetrahydrofuran; dioxane, dicyanocyclobutane, 1-methyl-2-oxohexamethyleneimine; and mixtures of these solvents in various proportions as may be required to attain solutions. It is often beneficial to leave a small residue of solvent in the dried composition so that the desired degree of imaging can be obtained upon subsequent irradiation. Ordinary drying such as that employed in paper manufacture or in film casting results in the retention of ample solvent to give a composition with good photosensitivity. The compositions so produced are dry to the touch and stable to storage at room temperature. Indeed, moisture of the air is absorbed by many of the compositions, particularly those comprising an acid salt of an amino leuco form of a dye on cellulosic substrates, and serves as a suitable solvent.

LIGHT SOURCES AND UTILITY

Any convenient sources of ultraviolet and visible light may be used for color-formation and deactivation. In general, sources that supply radiation in the region between about 2000 A. and about 4200 A. are useful in producing images with the leuco triarylmethane/hexaarylbiimidazole/quinone/reductant compositions described herein, while sources generating radiation in between 3900 A. and about 5000 A. are useful for deactivation. Such light sources include sunlamps, pulsed and continuous Xenon flash lamps, germicidal lamps, ultraviolet lamps providing specifically light of short wavelength (2537 A.) and lamps providing light of longer wavelengths, narrow or broad band, centered near 3600 A., 4200 A., 4500 A., or 5000 A., such as fluorescent lamps, mercury, metal additive and arc lamps. The light exposure time may vary from seconds to minutes, depending upon the intensity and spectral energy distribution of the light, its distance from the composition, the nature and amount of the composition available, and the intensity of color in the image desired.

The images to be recorded may be captured as direct or latent images using various devices for optical printing. With the composition described herein entire sheets may be printed as a complete format, or as composite information consisting of lines, characters or bits printed in sequence. These images are readily visible and can be readout by suitable optical devices. Photographic masks may be used for printing fixed format data such as lines, maps, plots, graphic and alphanumeric information. Variable information may be printed by creating individual characters serially or by printing information by a series of individual lines or dots. This may be accomplished by using a mask operated by electrostatic and/or magnetic devices. A narrow light beam having a digitally modulated scan such as a raster may be used to create images. Transfer of such information from the masks or light pattern generating mechanism can be accomplished using contact or projection printing techniques. Roll-to-roll duplication of master films may also be accomplished in an improved manner. By suitable sequence of exposures either light printing on a dark background or dark printing on a light background or a combination of both can be obtained.

EXAMPLES

The following examples illustrate the invention in greater detail. Quantities unless otherwise noted are in parts by weight.

EXAMPLE 1

A photosensitive film was prepared by applying the following composition on 5 mil polyester film and evaporating the carrier solvent (acetone) to a non-tacky coating about 1 mil thick:

| Ingredients: | Parts |
|---|---|
| Acetone | 46.0 |
| Cellulose acetate butyrate (thermoplastic binder) | 6.0 |
| Carbowax 550 (a polyethylene oxide M.W. 550) | 3.5 |
| Ethylene urea | 1.0 |
| Tris (p-diethylamino-o-tolyl) methane | 0.056 |
| 2,2' - (o - chlorophenyl) - 4,4',5,5'-tetraphenyl biimidazole. Absorption: $=24{,}900$ (max.) at 264 mμ; $\epsilon=12{,}100$ at 300 mμ | 0.099 |
| p-Toluene sulfonic acid monohydrate | 0.064 |
| Pyrenequinone (an approx. 1:1 mixture of the 1,6- and 1,8 isomers. Absorption: $\epsilon=4500$ at 350 mμ, 14,100 (max.) 450 mμ | 0.023 |

One portion of the film was exposed for 10 seconds at a distance of 4 inches to light from an Osram XBO-150 xenon lamp emitting untraviolet and visible wavelengths from about 300 mμ to above 700 mμ, the intensity increasing steadily between 300 and 450 then, except for peaking at 470 mμ, remaining fairly constant through the visible range. Another portion of the film was exposed to the same irradiation through a filter (Corning 0-51) showing the following light transmission characteristics.

| Percent transmission: | Wavelength, mμ |
|---|---|
| 0 | 350 |
| 10 | 370 |
| 30 | 380 |
| 50 | 390 |
| 67 | 400 |
| 90 | 500 |
| 90 | 700 |

In other words this filter to a large extent screens the ultraviolet components from the emitted light.

The extent of blue color formation resulting from such exposures is tabulated below as reflectance optical densities determined with a MacBeth reflectance quantalog densitometer to determine the extent of deactivation effected under the above conditions, the thus exposed samples were exposed to relatively intense ultraviolet light by contact flashing with a xenon flash lamp (Hico Lite, emitting ultraviolet and visible light approximating sunlight) at an intensity of about $1\times10^5$ mw./cm² for 0.001 second flash duration, and filtering this radiation through a filter (Schott UG-11) transmitting from 250 to 400 mμ and showing peak 90% transmission at 325 mμ. The results are tabulated in the following table in terms of the optical density (O.D.) above background (0.23 optical density units) of the blue dye coloration produced.

| Test | Initial exposure | Optical density | |
|---|---|---|---|
| | | After initial exposure | After flashing |
| This invention | Ultraviolet plus visible | [1] 0.07 | [2] 0.16 |
| Control | Visible | [1] 0.01 | [3] 0.44 |
| Do | None | [4] 0.00 | [5] 1.00 |

[1] Very little olor. [2] Pale blue. [3] Deep blue. [4] No color. [5] Very dark blue.

The results show that the invention method effects a much greater degree of deactivation than irradiation with visible light alone.

EXAMPLE 2

The photosensitive paper utilized below was obtained as follows:

A coating composition was prepared from the following ingredients:

54 ml. acetone
6 ml. 2-propanol
0.4180 g. 2,2'-(o-chlorophenyl)-4,4',5,5'-tetrakis(m-methoxyphenyl)biimidazole ($5.36\times10^{-4}$ mole)
0.0900 g. tris(4-diethylamino-o-tolyl)methane ($1.8\times10^{-5}$ mole)
0.40 g. p-toluenesulfonic acid monohydrate ($2.1\times10^{-3}$ mole)
1.0 ml. trimethyl 3,3',3''-nitrilotripropionate ($4.2\times10^{-3}$ mole)
0.054 g. 9,10-phenanthrenequinone ($2.6\times10^{-4}$ mole)
6.0 g. cellulose acetate butyrate (thermoplastic binder, Eastman EAB 171-40)
3.0 g. polyethyleneoxide adduct of o-phenylphenol prepared from 2.25 moles of ethylene oxide per mole of the phenol and having the average formula $$C_6H_5-C_6H_4-O(CH_2CH_2O)_{22.5}H$$

A high holdout calendared bleached sulfite paper was coated with the above composition. The paper was dried under hot forced air to a non-tacky surface. The photosensitive paper was exposed to visible light and visible in combination with ultraviolet light. The visible light was obtained by filtering the radiation from a high pressure mercury lamp through Corning filters 7-54 and 0-51, which in combination pass wavelengths in the 370-470 mμ range. The ultraviolet was obtained by filtering the radiation from another high pressure mercury lamp through a Corning 7-54 filter, which passes wavelengths in the 250-380 mμ range. The two lamps with filters were positioned to provide a total combined irradiance at the paper of 5 mw./cm.². The relative proportions of each radiation and the exposure times were adjusted as tabulated below.

The extent of deactivation effected by the indicated exposure was then determined by exposing the papers to ultraviolet from a Black Lite Blue (fluorescent) lamp for 60 seconds at a 6 inch distance, which exposure develops about a 0.9 reflectance optical density in unexposed samples.

The results of the above exposures are tabulated below.

DEACTIVATION EXPOSURE (D.E.)

| Example | Visible, mw./cm.² | Plus | U.V., mw./cm.² |
|---|---|---|---|
| Control | 5 | | 0 |
| 2 | 4 | | 1 |

| Deactivation time, seconds | Background reflectance optical density | | | |
|---|---|---|---|---|
| | Control | | Example 2 | |
| | After D.E. | After U.V. | After D.E. | After U.V. |
| 0 | | 0.90 | | 0.88 |
| 20 | | 0.68 | | 0.56 |
| 40 | | 0.52 | | 0.34 |
| 60 | | 0.42 | | 0.25 |
| 80 | | 0.35 | | 0.22 |
| 100 | | 0.31 | | 0.22 |
| 200 | 0.12 | 0.17 | 0.21 | 0.22 |

The data show that the combination of ultraviolet and visible is overall more effective for deactivation than visible light alone, even though the combination ultimately produces somewhat more color in the background. For example, only 40 seconds of exposure to the combined radiations is required to reach the degree of deactivation effected by 80 seconds visible light exposure.

Lower background colors may be obtained by increasing the intensity of the visible radiation or by decreasing the intensity of the ultraviolet component.

EXAMPLE 3

A photosensitive paper was prepared essentially as described in Example 2. The effect of ultraviolet light and visible light on deactivation was further determined as follows: Samples of the paper were exposed to (a) visible light from a Cool White fluorescent lamp at an irradiance at the paper's surface of 2.35 mw./cm.² for from 10 to 360 seconds, and simultaneously for the same length of time to (b) ultraviolet from a Black Lite Blue lamp at an irradiance at the paper's surface of 0.24, 0.35 or 0.47 mw./cm.², as noted below. The reflectance optical densities of the thus exposed (deactivated) papers were recorded and are given below as "O.D. after deactivation." The extent of deactivation after each such exposure was determined by further exposing to ultraviolet from the Black Lite Blue lamp at an irradiance of 2.75 mw./cm.² for 20 seconds. Typical results are expressed below as the time of exposure to the deactivating radiation required to deactivate the paper such that the optical density that develops on exposure to the ultraviolet color forming radiation is 0.5 O.D. units and 0.2 O.D. units.

| Example | Deactivating exposure, mw./cm.² | | O.D.[1] after deactivation | | Time (seconds) to deactivate to optical density | |
|---|---|---|---|---|---|---|
| | Visible | U.V. | | | 0.5 | 0.2 |
| Control | 2.35 | | 0.07 | White | 135 | 200 |
| A | 2.35 | 0.24 | 0.08 | do | 90 | 135 |
| B | 2.35 | 0.35 | 0.14 | Pale blue | 65 | 110 |
| C | 2.35 | 0.47 | 0.20 | Light blue | 57 | 150 |

[1] The O.D. developed on exposing the undeactivated compositions directly to 2.75 mw.]cm.² of ultraviolet for 20 seconds is 1.12. Thus deactivation to a maximum color forming potential of 0.2 O.D. units (0.13 above background) corresponds to about 94% deactivation.

The results show that inclusion of ultraviolet in the visible deactivating radiation significantly decreases the time required to achieve a particular degree of deactivation. The results also show that to achieve such enhanced deactivation without inducing some color formation in the background under this particular set of conditions the ultraviolet dosage in the deactivation step should be less than 0.35 mw./cm.². Thus it is apparent that the optimum intensities of the visible and the ultraviolet radiations for enhanced deactivation can be readily determined by trial for a given photoimageable/photodeactivatable system of the character described herein.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for deactivating a photoimageable photodeactivatable composition, which composition comprises an admixture of (A) a color-forming component comprising (1) an organic leuco dye color generator and (2) a photoactivatable hexaarylbiimidazole first oxidant which can oxidize the color generator to a colored compound on irradiating the first oxidant with ultraviolet light, and (B) a deactivating component comprising (1) a second photoactivatable oxidant which is activated by visible light radiation, is not an oxidant for the color generator but is reducible when activated by said visible light radiation, said second photoactivatable oxidant being a quinone and (2) a reductant for the second oxidant but not for the first oxidant, said reductant being capable of reducing the second oxidant on irradiation by said visible light radiation to a second reductant which is a reductant for the photoactivated first oxidant, whereby the second reductant prevents the color forming reaction between the color generator and the first oxidant, said reductant for the second oxidant being an ether or ester having abstractable hydrogen;

which process comprises exposing at least a portion of the surface of the composition to both ultraviolet and visible light radiation, simultaneously or sequentially with visible light exposure first, with the intensity of the ultraviolet radiation being an amount up to the maximum amount any portion of the entire surface of the composition can absorb without undergoing substantial color formation, and with the intensity of the visible light radiation being sufficient to deactivate the exposed portion of the composition.

2. The process of claim 1 wherein the first oxidant of the composition is a 2,2′,4,4′,5,5′-hexaarylbiimidazole, and said reductant for the second oxidant is a polyether or a compound of the formula $N[(CH_2)_nCOOR]_3$ wherein *n* is the integer 1 or 2 and R is lower alkyl.

3. The process of claim 1 wherein the color generator of the composition is a salt of a salt-forming acid and a leuco triarylmethane wherein at least two of the aryl groups are phenyl groups having (a) an $R_1R_2N$-substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxy, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio;

the first oxidant of the composition is a 2,2′,4,4′,5,5′-hexaphenylbiimidazole wherein the 2 and 2′ phenyl groups bear an ortho substituent selected from fluorine, chlorine, bromine, methyl and methoxy; and wherein the 4,4′, 5 and 5′ phenyl groups are either unsubstituted or are each substituted with one lower alkoxy group;

the second oxidant of the composition is selected from 1,6-pyrenequinone, 1,8-pyrenequinone, 9,10-phenanthrenequinone, or mixtures thereof; and said reductant for the second oxidant is a compound of the formula $N[(CH_2)_nCOOR]_3$ wherein *n* and R are defined as in claim 5.

References Cited

UNITED STATES PATENTS

| | | | |
|---|---|---|---|
| 3,390,994 | 7/1968 | Cescon | 96—48 |
| 3,390,996 | 7/1968 | MacLachlan | 96—48 |

DAVID KLEIN, Primary Examiner

W. H. LOWE, JR., Assistant Examiner